United States Patent
Roeber et al.

(10) Patent No.: US 11,926,260 B2
(45) Date of Patent: Mar. 12, 2024

(54) METHOD FOR OPERATING A PARKING ASSISTANCE FUNCTION OF A MOTOR VEHICLE

(71) Applicant: Ford Global Technologies, LLC, Dearborn, MI (US)

(72) Inventors: Marc Roeber, Roeber (DE); Florian Vieten, Meerbusch (DE)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 17/658,842

(22) Filed: Apr. 12, 2022

(65) Prior Publication Data
US 2022/0348139 A1    Nov. 3, 2022

(30) Foreign Application Priority Data
Apr. 29, 2021   (DE) .......................... 102021111031.9

(51) Int. Cl.
*B60Q 9/00* (2006.01)
*B60Q 1/50* (2006.01)
*B60W 30/06* (2006.01)
*B60W 40/105* (2012.01)

(52) U.S. Cl.
CPC ............. *B60Q 9/007* (2013.01); *B60Q 1/535* (2022.05); *B60Q 9/008* (2013.01); *B60W 30/06* (2013.01); *B60W 40/105* (2013.01); *B60Q 2400/50* (2013.01); *B60W 2552/53* (2020.02); *B60W 2554/80* (2020.02)

(58) Field of Classification Search
CPC ........ B60Q 9/007; B60Q 1/535; B60Q 9/008; B60Q 2400/50; B60Q 1/247; B60Q 1/525; B60W 30/06; B60W 40/105; B60W 2552/53; B60W 2554/80; B60W 2554/20; B60W 2554/402; B60W 2554/4041; B62D 15/0285
See application file for complete search history.

(56) References Cited

FOREIGN PATENT DOCUMENTS

JP         2020126433 A  *  8/2020

* cited by examiner

*Primary Examiner* — Daryl C Pope
(74) *Attorney, Agent, or Firm* — Frank Lollo; Eversheds Sutherland (US) LLP

(57) ABSTRACT

A method for operating a parking assistance function of a motor vehicle is described, wherein the motor vehicle comprises at least one sensor for detecting the road surrounding the motor vehicle. The method includes the following steps: Finding and specifying a free parking space; Determining a trajectory for parking the motor vehicle in the parking space and a sequence of an at least partially automated parking process; Determining at least one outer boundary line of the road surface required for parking along the identified trajectory; Detecting at least one road user approaching the determined outer boundary line on the road by means of at least one sensor; Determining the distance of the road user approaching the determined outer boundary line from the outer boundary line; if the determined distance falls below a specified first threshold, outputting a warning signal to the approaching road user.

12 Claims, 12 Drawing Sheets

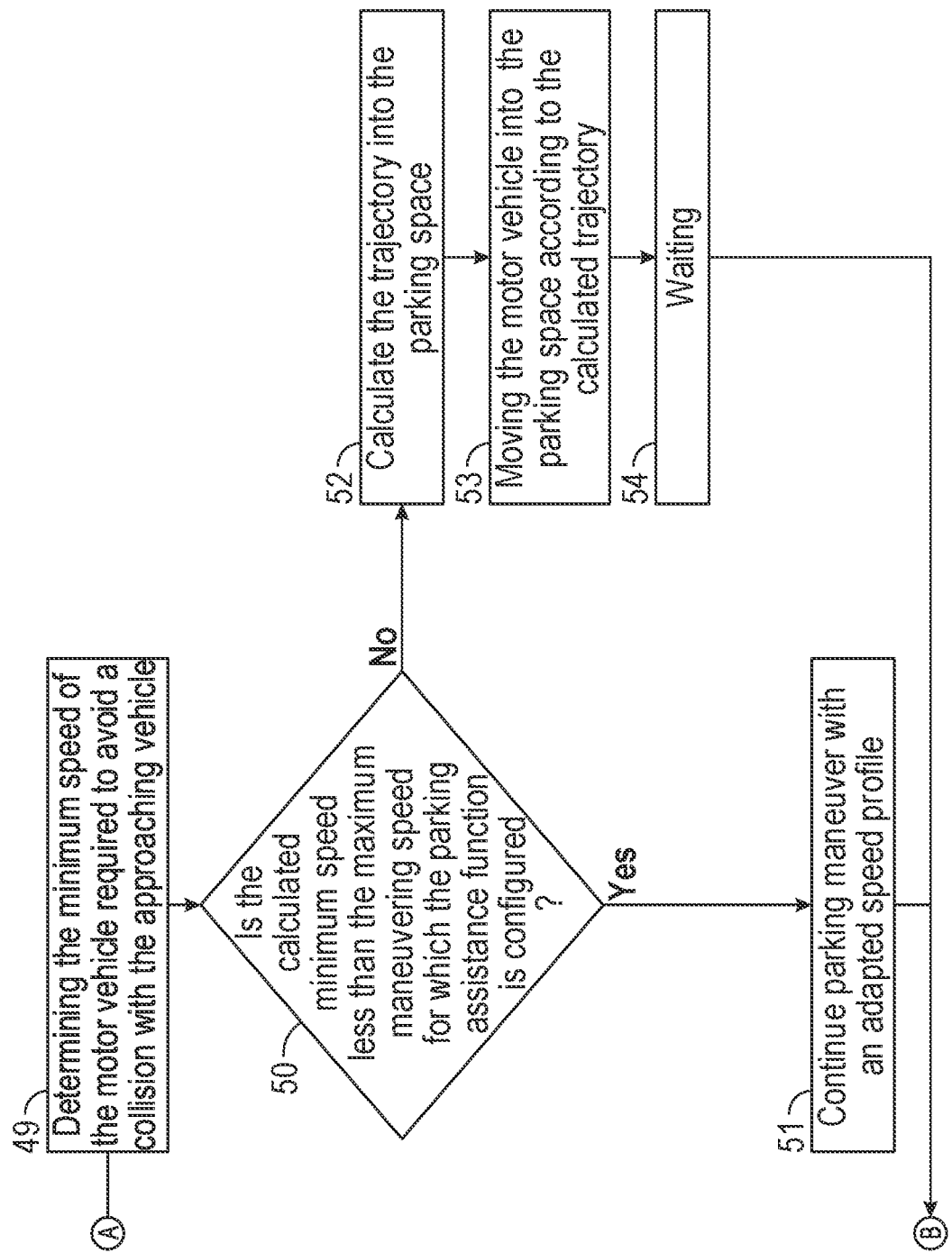

METHOD FOR OPERATING A PARKING ASSISTANCE FUNCTION OF A MOTOR VEHICLE

CROSS-REFERENCE TO RELATED APPLICATIONS

The present application claims priority to and the benefit of German Application No. DE 102021111031.9, filed Apr. 29, 2021, which is hereby incorporated by reference herein in its entirety.

FIELD

The present invention relates to a method for operating a parking assistance function of a motor vehicle, a parking assistance device, and a motor vehicle.

The invention also relates to a computer-implemented method, a computer program product, a computer-readable data carrier and a data carrier signal.

BACKGROUND

In connection with the use of motor vehicles, the situation often arises when parking that the user, in particular the driver, finds a suitable parking space for parking, but as soon as he starts parking, approaching vehicles block the necessary space for parking. It may then be necessary for the following traffic to either have to reverse to allow parking, or the driver may be forced to continue driving and look for another parking space. A similar problem can occur if it is necessary to swerve into the opposite lane at least partially in order to park and existing oncoming traffic prevents parking. With fully automatically controlled parking assistants or parking assistance functions, the driver also does not have the option of increasing the speed of the individual parking maneuvers in order to accelerate parking in the event of approaching traffic.

Documents US 2019/0135169 A, US 2020/0047807 A1, DE 10 2014 011 811 A1, U.S. Pat. No. 7,287,884 B2, U.S. Pat. No. 9,061,705 B2 and DE 10 2018 217 243 A1 describe various devices and methods which are used in connection with driver assistance functions, which, in particular in connection with parking assistance functions, enable illumination of the road surface required for parking or the road area required for a planned maneuver. In other words, the space which will be used for a planned driving maneuver is displayed to approaching traffic on the road surface.

SUMMARY

Against the background described, it is an object of the present invention to provide an improved method for operating a parking assistance function of a motor vehicle. Further objects of the invention consist in providing an advantageous parking assistance device for a motor vehicle, a motor vehicle, a computer-implemented method, a computer program product, a computer-readable data carrier and a data carrier signal. The aforementioned objects are achieved by a method for operating a parking assistance function, a parking assistance device according to Claim 11, a motor vehicle, a computer-implemented method, a computer program product, a computer-readable data carrier, and a data carrier signal. The dependent claims contain further advantageous embodiments of the invention.

The method according to the invention for operating a parking assistant or a parking assistance function of a motor vehicle relates to a motor vehicle which comprises at least one sensor for detecting the road surrounding the vehicle. The method includes the following steps: In a first step, a free parking space is searched for and determined. This can be done manually or automatically. In a further step, a trajectory for parking the motor vehicle in the parking space is determined and a sequence of an at least partially automated parking process is determined. Furthermore, at least one outer boundary line of the road surface required for parking along the determined trajectory is determined. In other words, the outer edge of the road surface used during the parking process is determined.

Optionally, the intention or aim to park in the parking space can be visually indicated, for example by light signals, in particular by flashing light or by means of external lights or by a projection of light patterns on the road surface and/or by illuminating the required maneuvering area on the road surface, preferably based on the determined trajectory.

In the context of the method according to the invention, at least one road user approaching the determined outer boundary line on the road, for example an approaching vehicle, is further detected by means of at least one sensor. The detected road user may be, for example, a motor vehicle, a bicycle, etc. Optionally, the detection can be limited to a distance or a gap below a specified maximum distance to the motor vehicle. This prevents road users who are too far away, who may not be relevant for the planned parking process, from being detected and taken into account. In a next step, the distance or gap of the at least one road user, which is approaching the determined outer boundary line, from the outer boundary line is determined. If the determined distance falls below a specified first threshold, a warning signal is output to approaching road user, for example in the form of a light pattern projected onto the surface of the road.

The intensity and color of the light pattern can be adapted to the current environmental conditions, in particular the weather, the time of day, the road surface and the color of the road surface. When illuminating the road surface required for parking, i.e. the maneuvering area, preferably only the area required in the future depending on the progress of the parking process is illuminated. Thus, the illuminated surface is preferably adapted to the progress of the parking process.

Preferably, when determining the outer boundary line, a specified or defined additional offset or additional safety distance based on the outer boundary of the motor vehicle is taken into account, i.e. is added accordingly. At least one camera and/or at least one radar sensor and/or at least one lidar sensor and/or at least ultrasonic sensor can be used as a sensor.

The method according to the invention has the advantage over the prior art described above that a situation-adapted active communication with other road users takes place and thereby the road safety during a parking process is significantly improved. The invention also has the advantage that it increases driving comfort by reducing the risk that another road user, in particular another vehicle, moves into the required maneuvering area during the parking process. This also reduces the stress potentially associated with parking for a user.

In an advantageous variant, the probability is determined that the detected road user crosses the outer boundary line. If the determined probability exceeds a specified threshold, an adapted warning signal is output to the approaching road user. In addition or alternatively, the course of the parking process can be adapted.

In another variant, if the determined distance exceeds a specified second threshold, the speed and/or acceleration of the approaching road user is determined. If the determined speed exceeds a specified threshold and/or the determined acceleration exceeds a specified threshold, an adapted warning signal is output to the approaching road user. In addition or alternatively, the course of the parking process can be adapted. By taking into account the speed and/or acceleration of the approaching road user, a procedure adapted to the respective risk of a collision is possible. In this way, a possible accident in connection with the parking can be effectively prevented. In particular, according to different warning levels, an adjustment of the warning signal, which can be output visually and/or acoustically, and/or an adjustment of the course of the parking process can be made. For example, an adjustment can be made depending on a classification of the approaching road user, for example, depending on whether it is a passenger car, a truck, a bus, a motorcycle, or a bicycle, etc. In addition or alternatively, the adjustment can be made depending on the weather conditions and/or a classification of features of the road surface.

In a preferred variant, the position of the motor vehicle and the position of the detected, approaching road user are determined as a function of the time. If it is not ensured that when the detected road user reaches the at least one safety line, the motor vehicle is in a position that allows the approaching road user to pass or drive past, a number of further steps of the method are carried out.

The at least one further step of the method is preferably dependent on whether the parking assistant or the parking assistance function allows automated longitudinal control of the motor vehicle, in other words, whether it is a semi-automated or a fully automated parking aid.

If the parking assistance function allows automated longitudinal control of the motor vehicle, i.e. it is a fully automated parking assistance function, it is checked, for example, whether the current movement of the motor vehicle is the first parking movement of the parking process. If this is the case, i.e. if it is the first parking movement, the minimum speed of the motor vehicle required to avoid a collision with the approaching road user will be calculated. A number of further steps of the method can be carried out depending on whether the calculated minimum speed required is lower than a maximum speed specified for the parking assistant or the parking assistance function. If the calculated speed is lower, the parking process can be continued with an adapted speed profile. If the calculated minimum speed is not lower than the specified maximum speed, the motor vehicle may be stopped and waiting performed until the approaching road user has moved past the motor vehicle.

If the parking assistance function allows automated longitudinal control of the motor vehicle, it is checked, for example, whether the current movement of the motor vehicle is the first parking movement of the parking process. If it is not the first parking movement of the parking process and if the determined parking space is not a parking space parallel to the road, the minimum speed required to avoid a collision with the approaching road user will be calculated. In addition, a number of further steps of the method can be carried out depending on whether the calculated minimum speed is lower than a maximum speed specified for the parking assistant or the parking assistance function. If the calculated minimum speed is lower than the specified maximum speed, the parking process can be continued with an adapted speed profile. If the calculated minimum speed is not less than the specified maximum speed, a trajectory for entering the motor vehicle into a parking space perpendicular to the road may be calculated and the motor vehicle may be moved along that trajectory into the parking space. This trajectory or the parking position achieved with it does not have to be the final parking position. Only a precautionary removal of the motor vehicle from the road is to be achieved in order to allow further traffic, in particular the approaching road user, to continue driving. There can therefore first be a wait until the at least one detected road user has moved away from the maneuvering area. The parking process can then be continued, for example with an adapted trajectory.

If the parking assistant or the parking assistance function does not allow automated longitudinal control of the motor vehicle, i.e. it is a semi-automated parking aid, the minimum speed required to avoid a collision with the approaching road user is calculated in a further variant and a number of further steps of the method are carried out depending on whether the calculated minimum speed is lower than a maximum speed specified for the parking assistant or the parking assistance function. If the calculated minimum speed is lower than the specified maximum speed, a signal can be sent to a user, such as a driver. The signal may include, for example, the recommendation to interrupt the parking process and/or the message that acceleration of the vehicle is possible to avoid a conflict or collision. If the calculated minimum speed is not less than the specified maximum speed, a number of further steps of the method can be carried out depending on whether the current movement of the motor vehicle is the first parking movement of the parking process. If it is the first parking movement, for example, a braking intervention can be carried out, i.e. a braking of the motor vehicle can be initiated. If it is not the first movement, a trajectory for driving the motor vehicle into a perpendicular parking space can be calculated. The driver can then be asked to drive the vehicle into the parking space along this trajectory. There can then be a wait until the required maneuvering area is free, in particular until the road user is outside the determined safety line.

The variants described above have the advantage that they enable a user to park without stress and comfortably even on busy roads.

The parking assistance device according to the invention for a motor vehicle comprises at least one sensor for detecting the vehicle surroundings. The parking assistance device is designed to carry out a previously described method according to the invention. The parking assistance device may include, for example, at least one camera and/or at least one radar sensor and/or a lidar sensor and/or at least one ultrasonic sensor. The parking assistance device according to the invention has the features and advantages already mentioned above in connection with the method according to the invention.

The motor vehicle according to the invention comprises a previously described parking assistance device according to the invention. It also has the features and advantages already mentioned. The motor vehicle may be a passenger car, a lorry, a bus, or a minibus, each with or without a trailer. The lamps or lights used in the context of the invention to generate light patterns or light signals may be mounted on all sides of the motor vehicle, for example in or on the exterior mirrors.

The computer-implemented method according to the invention comprises commands which, during execution of the program by a computer, cause it to carry out a method according to the invention described above. The computer program product according to the invention includes commands which, during execution of the program by a computer, cause it to carry out a method according to the invention described above. The previously described computer program product according to the invention is stored on the computer-readable data carrier. The data carrier signal according to the invention transmits the previously described computer program product. The computer-implemented method according to the invention, the computer program product according to the invention, the computer-readable data carrier according to the invention and the data carrier signal according to the invention have the advantages already mentioned in connection with the method according to the invention.

BRIEF DESCRIPTION OF THE FIGURES

The invention is explained in more detail below on the basis of exemplary embodiments with reference to the attached figures. Although the invention is illustrated and described in more detail by the preferred exemplary embodiments, the invention is not limited by the disclosed examples and other variations can be derived from this by the person skilled in the art without departing from the scope of protection of the invention.

The figures are not necessarily accurate in detail and true to scale and may be zoomed in or out to provide a better overview. Therefore, functional details disclosed here are not to be understood restrictively, but only as an illustrative basis which provides guidance to the person skilled in this field of technology to use the present invention in a variety of ways.

The term "and/or" used herein, when used in a series of two or more elements, means that each of the listed elements can be used alone, or any combination of two or more of the listed elements can be used. If, for example, a composition is described which contains the components A, B and/or C, the composition may contain A alone; B alone; C alone; A and B in combination; A and C in combination; B and C in combination; or A, B, and C in combination.

Figure 1:
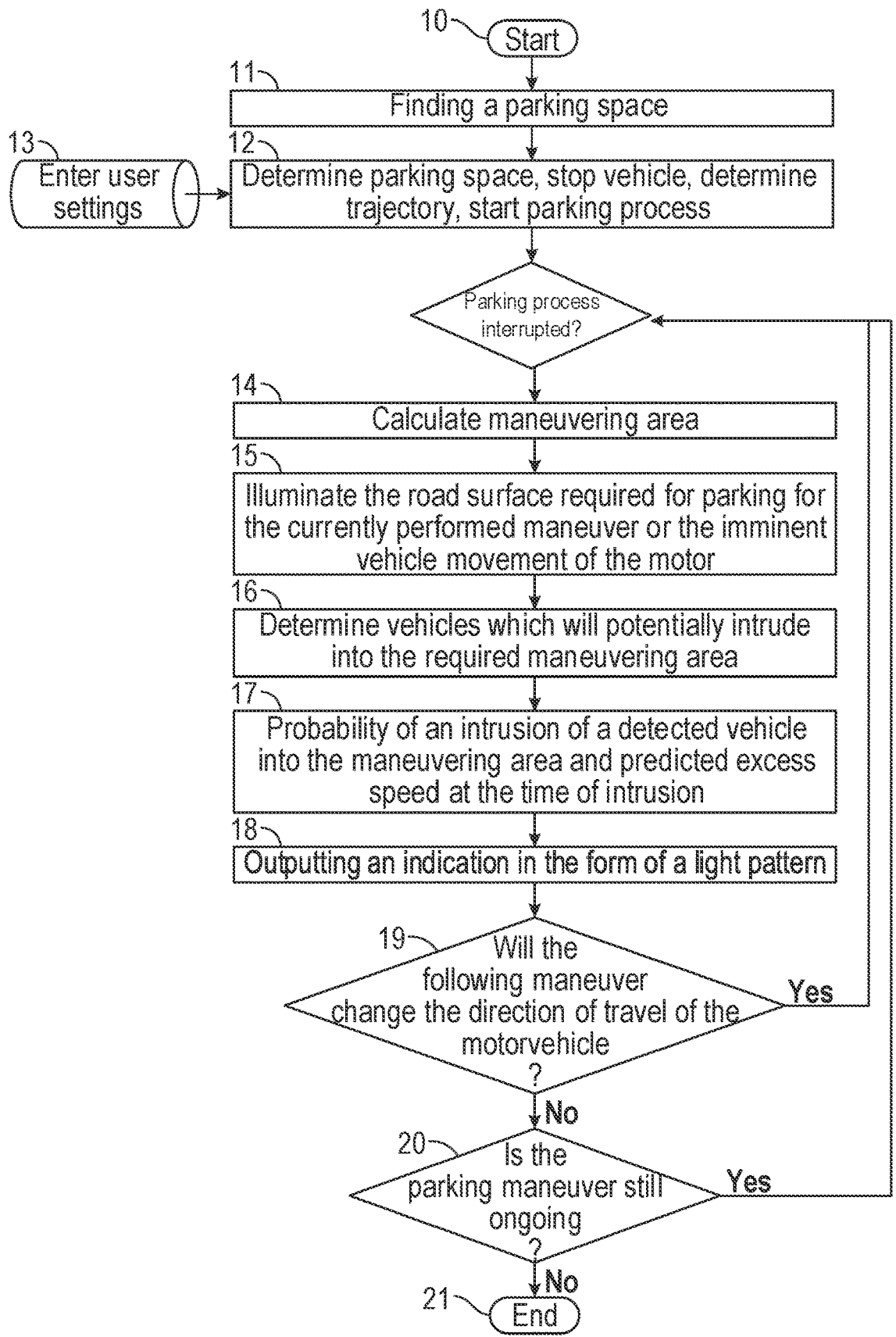

FIG. 1 shows schematically an exemplary method according to the invention in the form of a flow chart.

Figure 2:
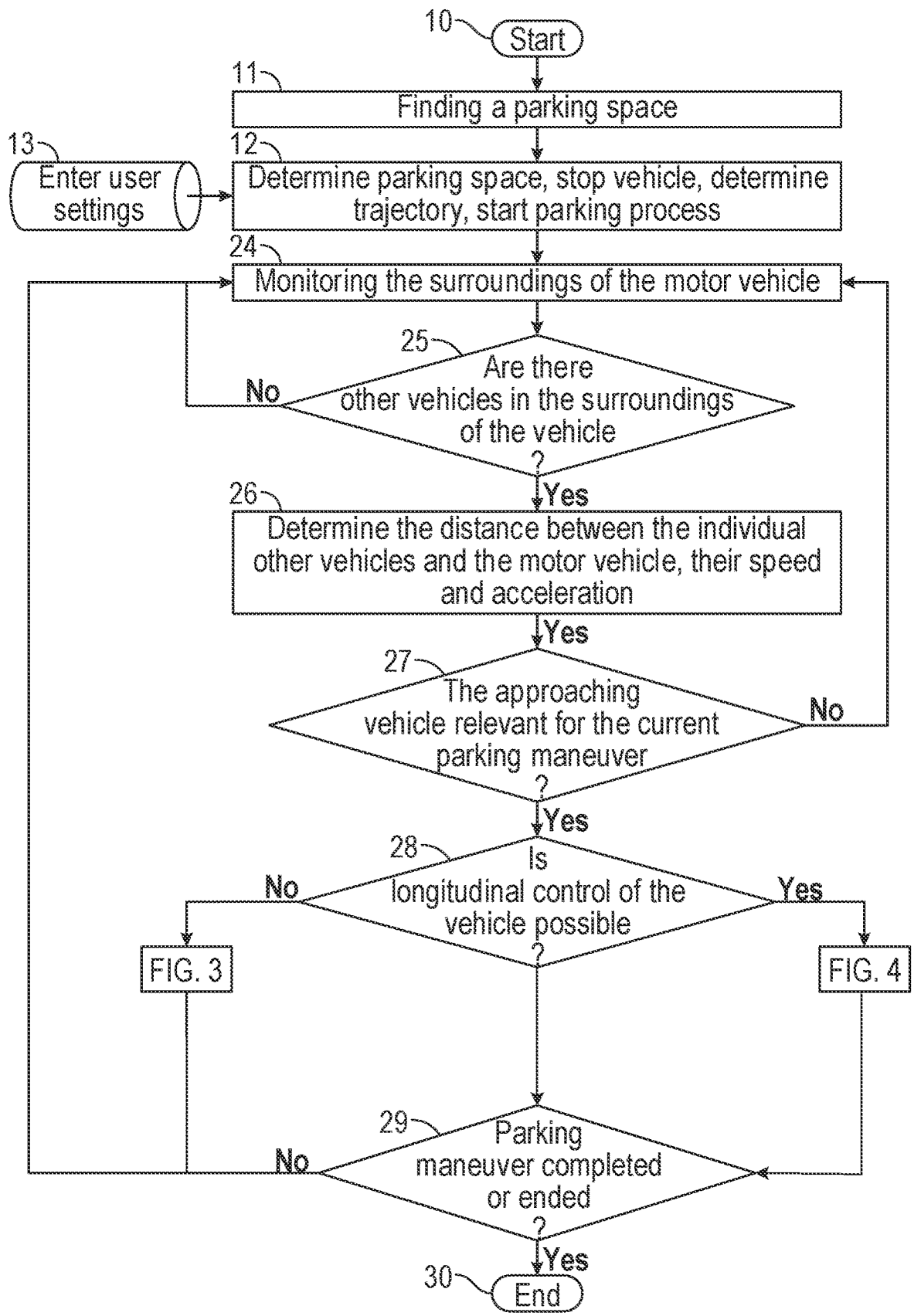

FIG. 2 shows schematically a variant of a method according to the invention in the form of a flow chart.

Figure 3:
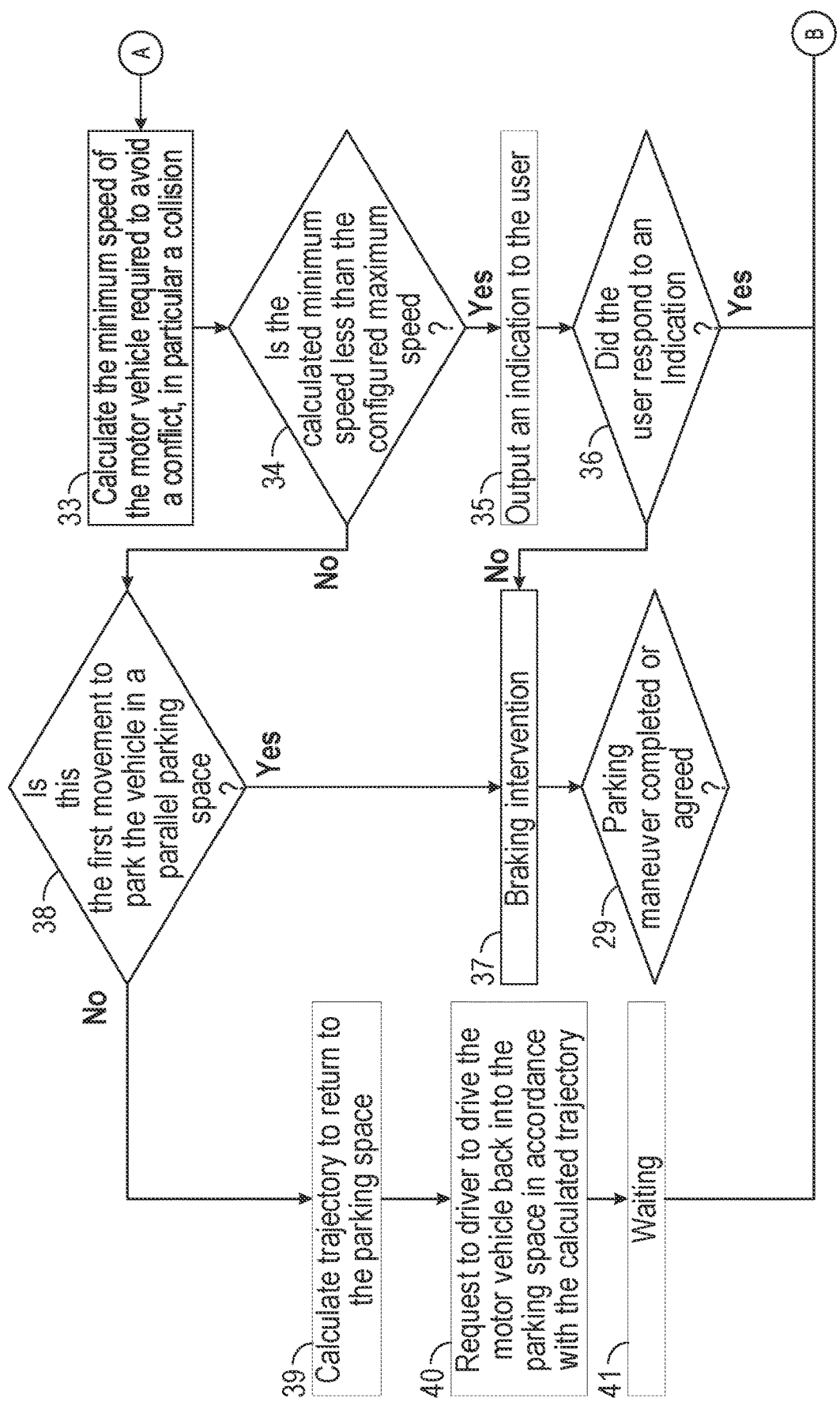
Figure 3:
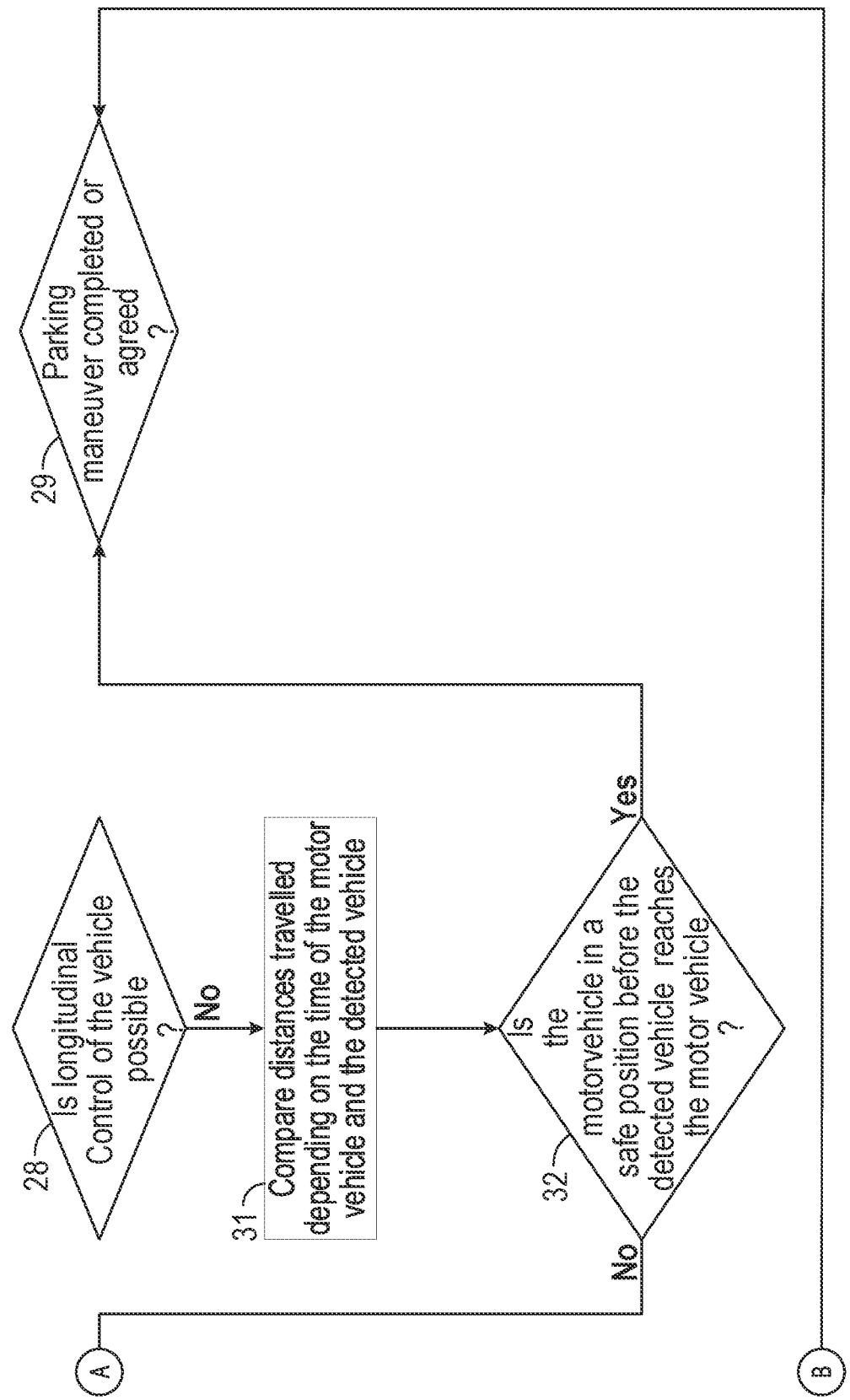

FIG. 3 schematically shows a subroutine of a method according to the invention shown in FIG. 2 for a semi-automated parking assistance function in the form of a flow chart.

Figure 4:
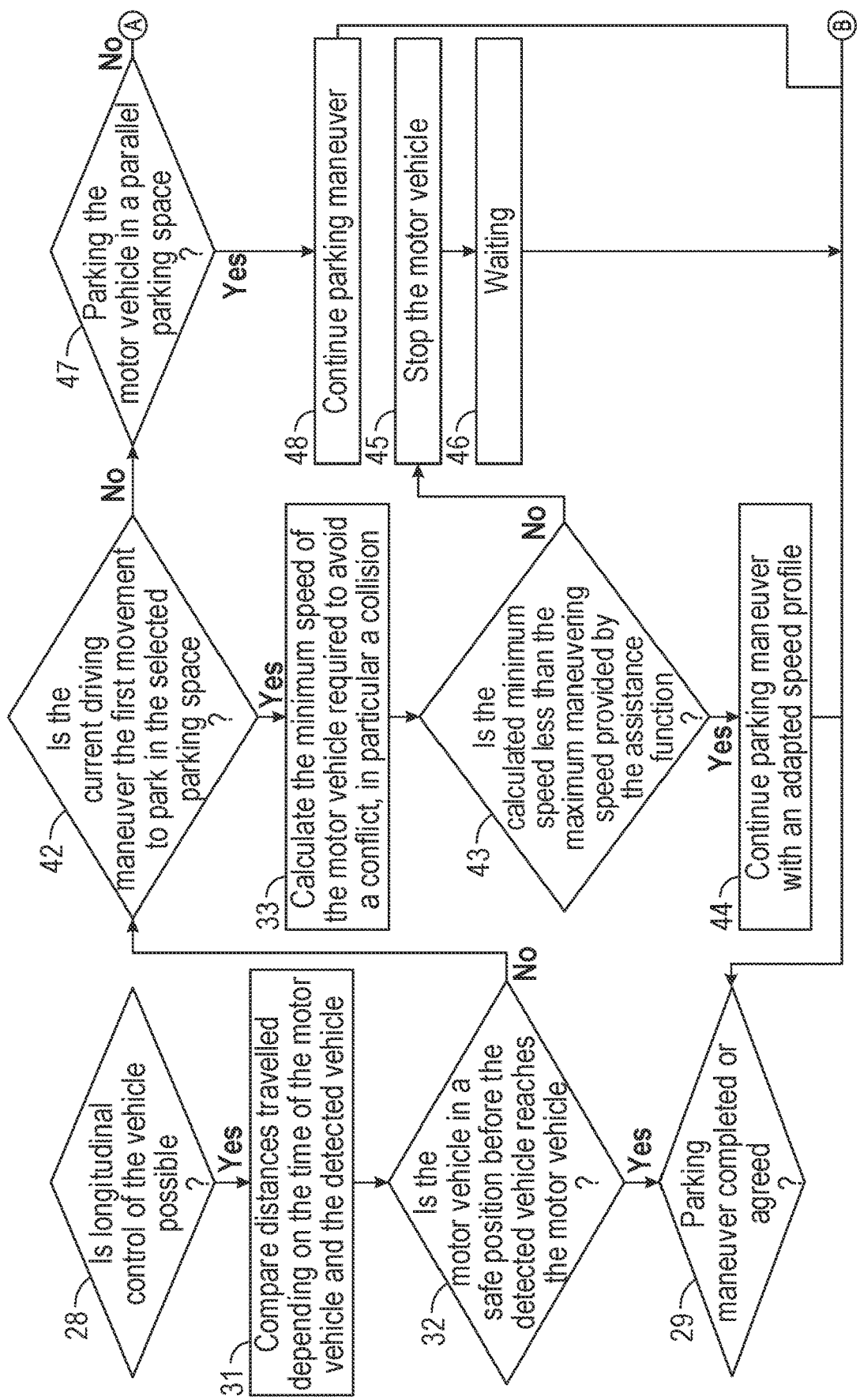

FIG. 4 shows schematically a subroutine of a method according to the invention shown in FIG. 2 for a fully automated parking assistance function in the form of a flow chart.

FIGS. 5-9 each show schematically a top view of a two-lane road during the execution of a method according to the invention.

Figure 10:
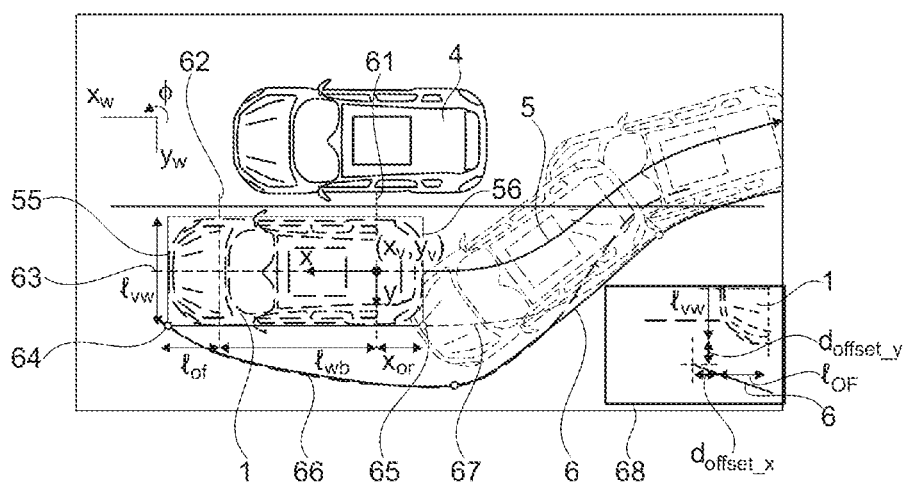
Figure 11:
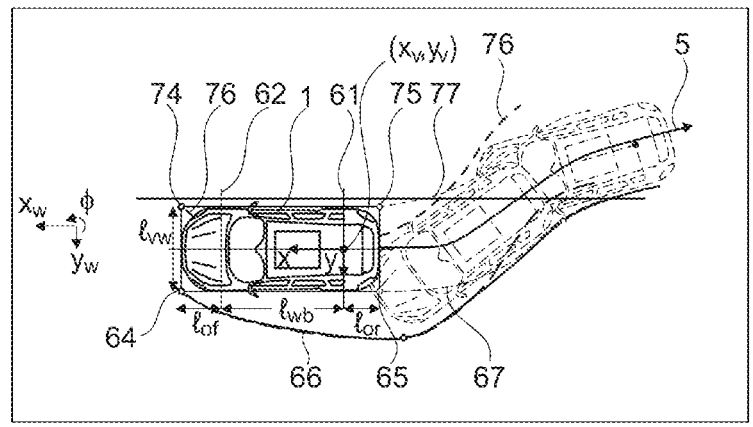

FIGS. 10-11 show schematically a top view of a motor vehicle and the calculation of the course of the safety line 6.

Figure 12:
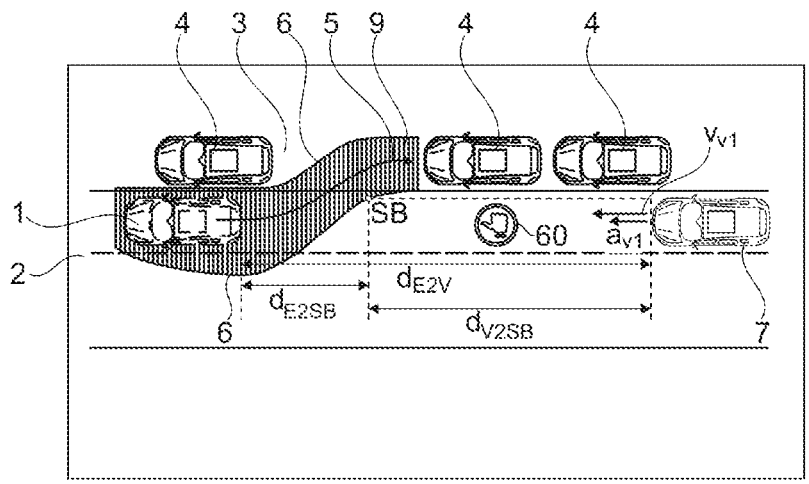

FIG. 12 shows a top view of a two-lane road during the execution of a method according to the invention.

Figure 13:
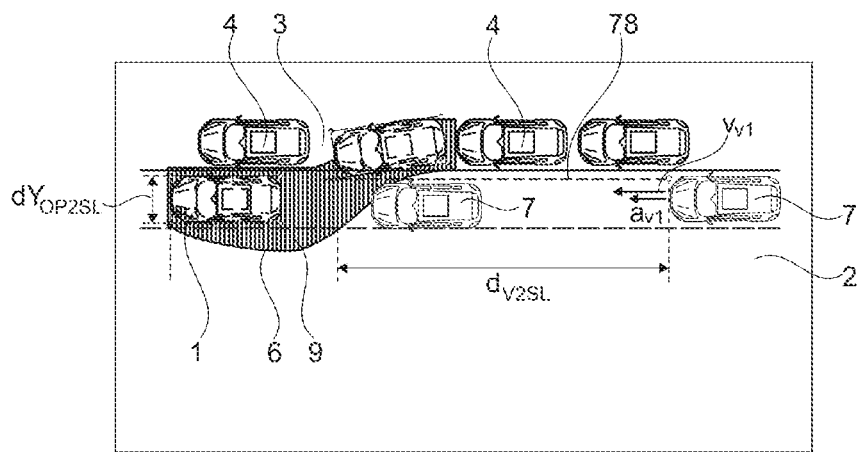

FIG. 13 shows schematically a top view of a two-lane road during the execution of a method according to the invention in a further variant.

Figure 14:
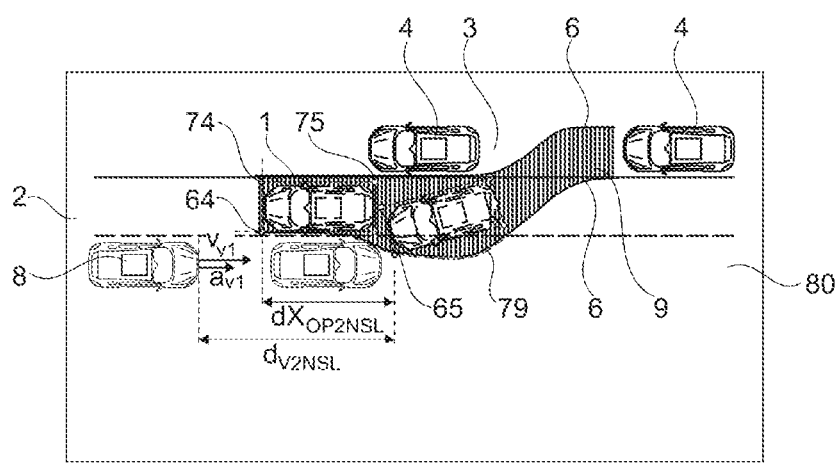

FIG. 14 shows schematically a top view of a two-lane road during the execution of a method according to the invention in a further variant.

Figure 15:
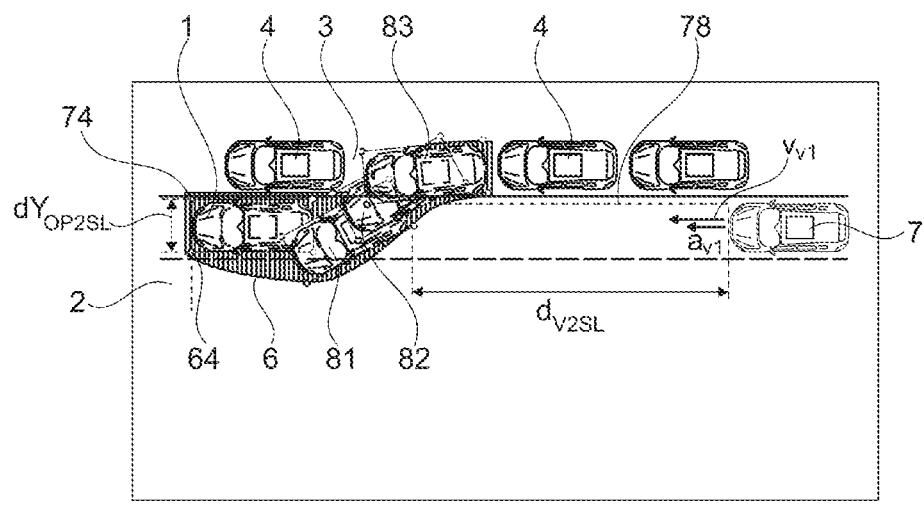

FIG. 15 shows schematically a top view of a two-lane road during the execution of a method according to the invention in a further variant.

DETAILED DESCRIPTION

A first variant of a method according to the invention is explained in more detail below on the basis of FIG. 1. FIG. 1 shows an exemplary method in the form of a flow chart. The method for operating a parking assistance function starts with step 10. In step 11, an active parking assistance system is used to scan the vehicle surroundings for a suitable parking space, which is either free or from which another vehicle is currently unparking.

In step 12, the parking assistance system determines a suitable parking space, and the driver stops the vehicle at a suitable position. Individual user settings can be taken into account, for example desired road lighting or distances to neighboring vehicles. Corresponding user settings are indicated by the input block 13. The parking process is also started in step 12.

In this context, a planned trajectory has already been calculated. The start of the parking maneuver can be marked in various ways, for example, a reverse gear can be automatically engaged by the system, the driver can confirm the start of the maneuver via a human-machine interface (HMI) or via a dedicated input device, or the driver leaves the vehicle (in the case of remote parking variants). In the case of aborted or interrupted parking processes or parking maneuvers, it may be provided that no otherwise provided special road lighting is carried out to mark the maneuvering area.

In step 14, based on the trajectory already determined in step 12, the area required by the motor vehicle for the imminent movement is calculated. In step 15, the area outside the vehicle is illuminated, which is required for parking for the currently performed maneuver or the imminent movement of the motor vehicle. In the context of step 15, only the area required for the current movement is illuminated or displayed. Preferably, areas which were needed previously are no longer illuminated.

In step 16, other road users, preferably other vehicles, which will potentially intrude into the required maneuvering area, are identified or determined. This is preferably done by means of at least one sensor, for example a camera. Object recognition methods can be used here. In step 17 the probability of an intrusion of a vehicle determined in step 16 into the maneuvering area, as well as the speed at which the approaching vehicle is expected to cross the maneuvering area, are determined. In the context of the exemplary embodiments, vehicles are considered as approaching road users by way of example. The present invention can of course also be implemented accordingly for other road users.

In step 18, an indication to the approaching vehicle in the form of a light pattern is projected onto the road surface. This may be a warning symbol and/or appropriate information. These are preferably adapted to a reference scheme, which links the way of warning the approaching traffic to different warning levels, in particular to the speed and/or the distance of the approaching vehicle. Furthermore, as part of step 18, the motor vehicle can be braked automatically or stopped completely if another vehicle or road user reaches or exceeds the intended maneuvering area. In principle, the communication actions carried out in step 18, i.e. suitable lighting or the sending of warning information or automatic interventions in the planned movement of the vehicle, can be defined and individually specified by user input, for example via a suitable input menu 13.

In step 19, it is checked whether the following driving maneuver will change the direction of travel of the motor vehicle. If this is the case, the method jumps back to step 14. If this is not the case, it is checked in step 20 whether the parking maneuver is still ongoing. If this is the case, the method jumps back to step 14. If this is not the case, the method ends in step 21. In step 20, it can be checked in particular whether the parking process has ended or has been cancelled or interrupted.

A further variant of a method according to the invention is explained in more detail below on the basis of FIGS. 2 to 4. These figures illustrate the method in the form of flowcharts.

The steps 10 to 13 of the method correspond to the steps explained in connection with FIG. 1. Following step 12, as part of the method shown in FIG. 2 in step 24, the surroundings of the motor vehicle are monitored with regard to potential other road users, in particular vehicles. For example, at least one suitable sensor, for example radar, lidar, ultrasonic sensors, cameras, etc., can be used to determine whether there are other road users present, in particular vehicles.

In step 25 a check is carried out as to whether there are other vehicles in the vicinity of the vehicle, for example whether other vehicles are present within a specified radius or within a specified distance on the road from the motor vehicle and are approaching the motor vehicle. If this is not the case, the method jumps back to step 24. If this is the case, in step 26 the distance between the individual other vehicles and the motor vehicle, their speed and acceleration, i.e. their change in speed over time, are determined. A distinction can be made here. For example, below a specified speed threshold of another road user, in particular a vehicle, only its distance from the motor vehicle may be determined and taken into account. Above a defined speed, which may be the aforementioned speed limit, the speed and acceleration of the other road user approaching the vehicle can also be determined and taken into account.

Following step 26, in step 27 a check is carried out as to whether the detected, in particular approaching road user, for example an approaching vehicle, is relevant for the current parking maneuver. In this context, account may be taken, in particular, of whether the other road user is moving away from or approaching the motor vehicle and/or whether it is moving on the side of the road of the motor vehicle or a different side.

If it is determined in step 27 that the detected road user is not relevant for the current parking maneuver, the method jumps back to step 24. If it is determined in step 27 that the detected road user is relevant for the current parking maneuver, it is checked in step 28 whether the parking assistance system used, i.e. the APA feature or the parking assistance system used, enables or supports longitudinal control of the vehicle. If this is the case, the method is continued according to the subroutine shown in FIG. 4. If this is not the case, the method is continued according to the subroutine shown in FIG. 3.

Following the selected subroutine, in step 29 a check is carried out as to whether the parking maneuver has ended or has been aborted. If this is not the case, the method jumps back to step 24. If this is the case, the method ends with step 30.

The subroutine shown in FIG. 3 in the form of a flow chart concerns semi-automatic parking. In this variant, following step 28 of the method shown in FIG. 2, in step 31 the distance traveled by the motor vehicle as a function of time is compared with the distance traveled by the detected approaching vehicle as a function of time. Subsequently, in step 32, it is checked whether the motor vehicle arrives in a safe position before the detected vehicle or the detected road user reaches or passes the motor vehicle. If this is the case, the method jumps to step 29 of the method shown in FIG. 2.

If this is not the case, in step 33 the minimum speed of the motor vehicle required to avoid a conflict, in particular a collision, is calculated. In step 34, it is checked whether the calculated minimum speed is lower than the configured maximum permitted speed in the context of the parking assistance function. If this is the case, a notice and/or warning is output to the driver or user in step 35. This can be done visually and/or audibly. For example, the driver can be informed about the required speed for further maneuvers.

Following step 35, in step 36 it is checked whether the driver reacts to the information and/or warning provided in step 35. If this is the case, the method jumps to step 29 of the method shown in FIG. 2. If this is not the case, a braking intervention is carried out in step 37, for example in the form of a sudden brake intervention and/or by braking the vehicle to a standstill. The purpose of the braking intervention is to indicate the situation and its potential consequences to the driver and/or to bring the vehicle into a safe condition. Only braking or stopping the vehicle can be carried out. Following step 37, the method jumps to step 29 of FIG. 2.

If the check in step 34 shows that the calculated minimum speed is not less than the configured maximum speed, in step 38 it is checked whether the current parking process is a first movement to park the vehicle in a parallel parking space. If this is the case, the method is continued with step 37. If this is not the case, a trajectory for returning to the parking space is calculated in step 39. Then, in step 40, the driver is asked to return to the parking space according to the calculated trajectory. Following step 40, in step 41 waiting is carried out until the detected vehicle has moved away sufficiently. Following step 41, the method jumps to step 29 in FIG. 2.

In FIG. 4 a subroutine in the form of a flow chart is shown, which can be performed between steps 28 and 29 of FIG. 2 in the case of a fully automatic parking assistance function. Thus, if in step 28 of FIG. 2 the parking assistance function of the motor vehicle supports longitudinal control of the motor vehicle, steps 31 and 32, as described in connection with FIG. 3, are continued first.

If the check in step 32 shows that the motor vehicle is in a safe position before another vehicle reaches it, the method jumps to step 29 of FIG. 2. If this is not the case, in step 42 it is checked whether the current driving maneuver is the first movement to park in the selected parking space. If this is the case, the minimum speed of the vehicle required to avoid a collision is calculated in step 33, which corresponds to step 33 of FIG. 3. Subsequently, in step 43, it is checked whether the calculated minimum speed is lower than the maximum maneuvering speed provided by the assistance function. If this is the case, the parking maneuver is continued in step 44 with an adapted speed profile. Following step 44, the method jumps to step 29 of FIG. 2.

If, in step 43, the calculated minimum speed is not lower than the intended maximum maneuvering speed, the motor vehicle is completely stopped in step 45. This can be done, for example, in various ways, for example by initiating full braking or by slowing down the motor vehicle slowly according to a configured acceleration profile and moving along the planned trajectory or by stopping the motor vehicle parallel to the parking space to signal that the parking space is occupied. In addition or alternatively, signals can be sent to other road users, for example by means of hazard warning lights, switching on the lighting, emitting acoustic signals (for example, honking signals) or by light projections on the road surface. Following step 45, in step 46 waiting is carried out until the relevant other road users, in particular the at least one vehicle, are outside the area required for parking.

If the check in step 42 shows that the current driving maneuver is not the first movement to park in a selected parking space, in step 47 it is checked whether the motor vehicle is parking in a parallel parking space. In the case of parking in a parallel parking space, it can be assumed that from the second parking movement all further movements take place in a spatial area, for example behind a defined safety line, in which there is no risk of a collision. If the check in step 47 shows that the motor vehicle is parking in a parallel parking space, the parking maneuver is continued in step 48 until the calculated final position is reached. Following step 48, the method jumps to step 29 of FIG. 2.

If the check in step 47 shows that the motor vehicle is not parking in a parallel parking space, in step 49 the minimum speed of the motor vehicle required to avoid a collision with the approaching vehicle is determined. Then, in step 50, it is checked whether the calculated minimum speed is lower than the maximum maneuvering speed for which the parking assistance function is configured. If this is the case, the parking maneuver is continued in step 51 with an adapted speed profile. Following step 51, the method jumps to step 29 of FIG. 2. If the check in step 50 shows that the calculated minimum speed is not lower than the maximum maneuvering speed, a trajectory is calculated back into the parking space in step 52, then in step 53 the motor vehicle is moved into the parking space according to the calculated trajectory, and then in step 54 waiting is carried out until the area required for parking is free of other road users. Following step 54, the method jumps to step 29 of FIG. 2.

In FIGS. 3 and 4, mutually corresponding steps of the method are denoted by the same reference numbers.

A parking process into a parallel parking space according to a method according to the invention is illustrated below on the basis of FIGS. 5 to 9. FIGS. 5 to 9 each show a top view of a two-lane road 2. A motor vehicle 1 according to the invention, which comprises a parking assistance device 57, which is designed to carry out a method according to the invention, intends to park parallel to lane 2 in a free parking space 3 between motor vehicles 4 already parked parallel to lane 2. The motor vehicle 1 comprises a parking assistance device. The parking assistance device is designed to carry out a method according to the invention, in particular as described in FIGS. 1 to 4. By means of the parking assistance device, a trajectory 5 for parking the motor vehicle 1 is calculated. Furthermore, based on the geometry and dimensions of the motor vehicle 1, as well as the calculated trajectory 5, an outer safety line or its course 6 is calculated. The safety line 6 indicates the road area used by the motor vehicle 1 in the course of the parking process, preferably plus a specified safety distance.

Other motor vehicles using the road 2 are denoted by reference numbers 7 and 8. A motor vehicle 7 is moving in the direction of travel behind the motor vehicle 1 and a motor vehicle 8 is moving on the opposite lane opposite to the direction of travel of the motor vehicle 1.

Following the calculation of the trajectory 5 and the at least one safety line 6, the road area 9 required for parking is illuminated by suitable lighting devices of the motor vehicle 1 before the start of the parking process. This is shown schematically in FIG. 6, wherein the illuminated road surface is denoted by the reference number 9. Optionally, indication signs can be projected onto the road 2 for approaching road users, such as approaching vehicles 7, 8. In the figures, the indication signs are denoted by the reference number 60. The illuminations 9 and 60 of the road surface shown signal to approaching road users how far they can approach the motor vehicle 1 without hindering the parking process.

Figure 5:
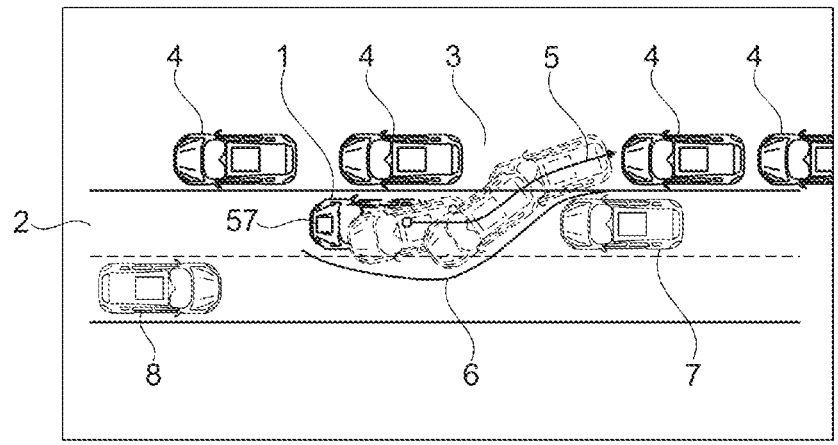
Figure 6:
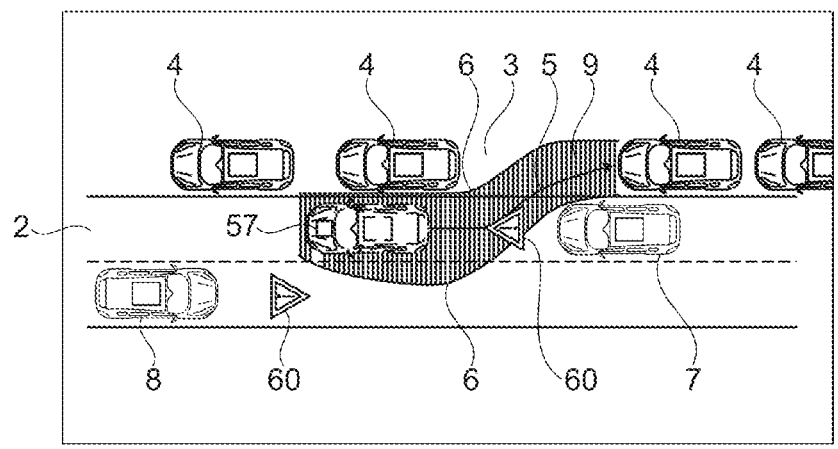
Figure 7:
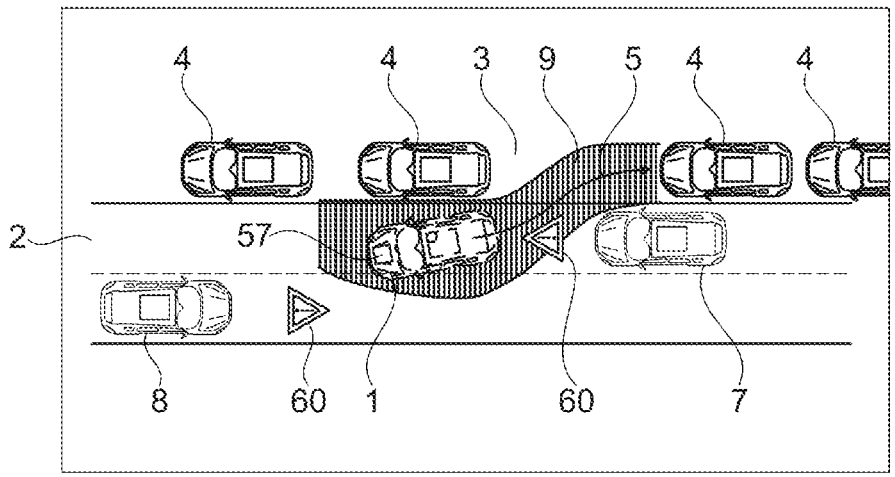
Figure 8:
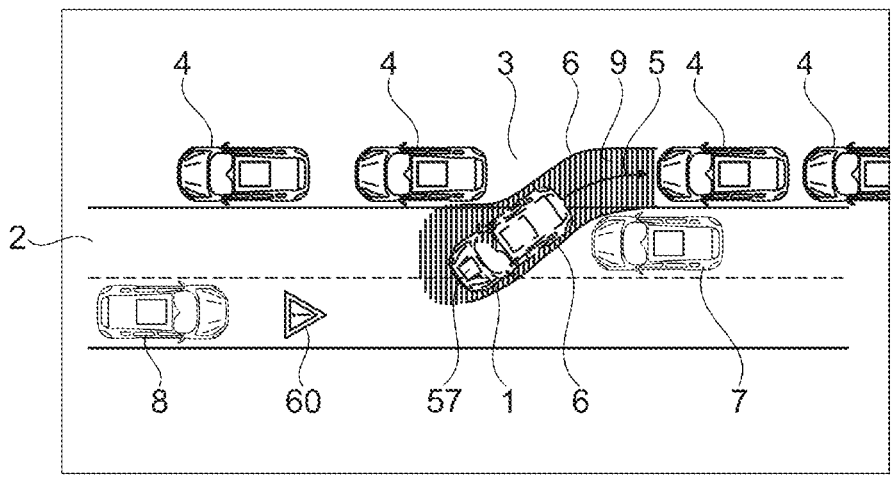
Figure 9:
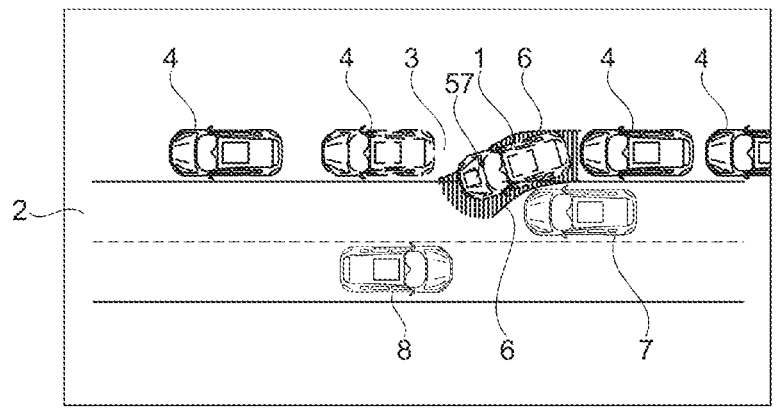

FIG. 5 shows the determination of the outer safety line 6, for example by a simulation of the planned parking process. FIG. 6 shows the motor vehicle in a starting position. FIG. 7 shows schematically a first parking maneuver, wherein the motor vehicle 1 is reversing and slightly swinging out onto the opposite lane. FIG. 8 shows the further reversing movement of the motor vehicle 1, wherein this swerves to the opposite lane by the maximum amount. At the same time, the illumination of the road surface 9 was adapted to the progress already made in the parking process. This means that only the road surface required in the future will be illuminated and the projection of indication signs will be adapted accordingly. In FIG. 9, the parking process is already so advanced that the motor vehicle 1 no longer needs a road surface of the opposite lane for further parking. Accordingly, no indication sign 60 is projected onto the surface of the opposite lane.

The calculation of the course of the safety line 6 is explained below on the basis of FIG. 10. A global coordinate system is described by the direction vectors $x_w$ and $y_w$, and a yaw angle $\phi$ around the z-axis perpendicular to the direction vectors $x_w$ and $y_w$. The local coordinate system of the motor vehicle 1 is indicated by the direction vectors x and y. Points related to this coordinate system are described by the coordinates $(x_v, y_v)$. In the variant shown, the z-axis of the local coordinate system intersects the rear axle 61 of the motor vehicle 1. The y-axis runs parallel to the rear axle 61. The x-axis runs parallel to the longitudinal axis 63 of the motor vehicle 1. The front axle is denoted by the reference number 62.

The motor vehicle 1 has a width $I_{vw}$. The distance between the front axle 62 and the rear axle 61 is denoted by $I_{wb}$. The distance between the front axle 62 and the front of the vehicle 55 is denoted by $I_{of}$. The distance between the rear axle 61 and the tail end of the vehicle 56 is denoted by $I_{or}$.

The left-side extreme left-side front point of the motor vehicle 1 resulting from the length and width of the motor vehicle 1 is denoted by reference number 64. Analogously, the extreme left-side rear point is denoted by the reference number 65. For both the extreme left-side front point 64 and the extreme left-side rear point 65, the trajectories of points 64 and 65 resulting during the parking process are calculated on the basis of the calculated and already known trajectory 5. The geometry of the motor vehicle 1 and its dimensions are taken into account here. The trajectory of the extreme left-side front point 64 is denoted by line 66. The trajectory of the extreme left-side rear point 65 is denoted by the trajectory 67. The safety line 6 is calculated from trajectories 66 and 67. Already when determining the coordinates of points 64 and 65, a safety distance in the y-direction $d_{offset\_y}$ and/or a safety distance in the x-direction $d_{offset\_x}$ can be added. Alternatively, a safety line 6 resulting from the trajectories 66 and 67 can first be calculated and a safety distance can be added to this in the x-direction and/or in the y-direction. The safety line 6 is derived from the trajectories 66 and 67 in such a way that for each x-value the maximum y-value, i.e. the larger value of the trajectories 66 and 67, is used to form the safety line 6.

The image section 68 in FIG. 10 shows the determination of the extreme left-side front point 64 plus a safety distance in the x-direction and in the y-direction in an enlarged partial section. The respective safety distance $d_{offset}$ can be predetermined or individually specified by a user. The position of the point 64 along the trajectory 5 can be calculated as follows:

$$x_0 = x_v + (I_{wb} + I_{of} + d_{offset\_X}*(1-\sin(\alpha))*\cos(\phi) - \sin(\phi)* \\ (\tfrac{1}{2}*I_{vw} + d_{offset\_Y}*(1-\sin(\alpha)))$$

$$y_0 = y_v + (I_{wb} + I_{of} + d_{offset\_X}*(1-\sin(\alpha))*\sin(\phi) + \cos(\phi)* \\ (\tfrac{1}{2}*I_{vw} + d_{offset\_Y}*(1-\sin(\alpha)))$$

$\alpha$ denotes the steering angle of the front wheels when moving along the trajectory 5.

FIG. 11 also shows the extreme right-side front point 74, its trajectory 76 during the parking process and the extreme right-side rear point 75 as well as its trajectory 77 during the parking process. By means of the trajectories 76 and 77, a right-side trajectory 6 can be calculated analogously to the previously described calculation of the left-side safety line 6 based on the trajectories 66 and 67. On the basis of the formulas given above, the following formulas are obtained without taking into account a safety distance for the coordinates of the extreme points, wherein the extreme right-side front point 74 is denoted by the index FR, the extreme left-side front point 64 by the index FL, the extreme right-side rear point 75 by the index RR and the extreme left-side rear point by the index RL:

$$x_{FR} = x_v + (I_{wb} + I_{of})*\cos(\phi) + \tfrac{1}{2}*\sin(\phi)*I_{vw}$$

$$y_{FR} = y_v + (I_{wb} + I_{of})*\sin(\phi) - \tfrac{1}{2}*\cos(\phi)*I_{vw}$$

$$x_{FL} = x_v + (I_{wb} + I_{of})*\cos(\phi) - \tfrac{1}{2}*\sin(\phi)*I_{vw}$$

$$y_{FL} = y_v + (I_{wb} + I_{of})*\sin(\phi) + \tfrac{1}{2}*\cos(\phi)*I_{vw}$$

$$x_{RR} = x_v - (I_{wb} + I_{of})*\cos(\phi) + \tfrac{1}{2}*\sin(\phi)*I_{vw}$$

$$y_{RR} = y_v - (I_{wb} + I_{of})*\sin(\phi) - \tfrac{1}{2}*\cos(\phi)*I_{vw}$$

$$x_{RL} = x_v - (I_{wb} + I_{of})*\cos(\phi) - \tfrac{1}{2}*\sin(\phi)*I_{vw}$$

$$y_{RL} = y_v - (I_{wb} + I_{of})*\sin(\phi) + \tfrac{1}{2}*\cos(\phi)*I_{vw}$$

An implementation variant is described below on the basis of FIG. 12, in which an approaching vehicle 7 is informed and possibly warned about the parking process as part of the parking process by means of symbols 60 projected onto the road surface. By means of a sensor of the motor vehicle 1, the distance of the motor vehicle 1 from an approaching vehicle 7 is determined. Optionally, the speed $v_{v1}$ and/or the acceleration $a_{v1}$ of the approaching vehicle 7 (V1) is also determined. The distance is denoted in the figure by $d_{E2V}$. From the distance $d_{E2V}$ and the determined safety line 6, the distance $d_{v2SB}$ of the vehicle 7 from a point SB of the safety line 6 is calculated. The point SB denotes the extent of the safety line 6 in the y-direction, with which the vehicle V1 or 7 can pass the motor vehicle 1 without a collision, i.e. if the motor vehicle 1 does not protrude from the parking space onto the road 2 further in the y-direction than to the y-coordinates of the point SB.

Furthermore, the distance $d_{E2SB}$ of the motor vehicle 1 in the x-direction from the safety point SB is calculated. In addition, the distance $$d_{slowdown} = \frac{v_{V1}^2}{2*a_{V1}}$$

and the speed of the vehicle V1 or 7 on reaching the parking space $$v_{enterparkzone} = v_{V1} + a_{V1} * \sqrt{2 * \frac{d_{E2SB}}{a_{V1}}}$$

is calculated. If the distance $d_{slowdown}$ is smaller than the distance $d_{v2SB}$ ($d_{slowdown} < d_{v2SB}$), a first warning signal is projected onto the road surface in front of the vehicle 7, for example an encircled green thumb. If the speed $v_{enterparkzone}$ is between 0 and a specified threshold speed $v_{warn}$, a second warning signal is projected onto the road surface, for example an orange exclamation mark. If the speed $v_{enterparkzone}$ of the vehicle 7 is greater than or equal to the threshold speed, a third warning symbol is projected onto the road surface, for example an exclamation mark marked in red. In other words, depending on the distance, speed, and acceleration of the approaching vehicle 7, an adapted warning signal is output, which can be output visually and/or acoustically.

A further variant is explained in more detail below on the basis of FIG. 13. In FIG. 13, the distance between the extreme front point 64 and the second safety line 78, and between the extreme rear point 65 and the second safety line 78 is denoted by $dY_{OP2SL}$. Furthermore, a second safety line 78 has been defined in FIG. 13. This line marks the distance from the extreme edge 79 of the road, which can be occupied by the motor vehicle 1 without causing any obstruction of an approaching vehicle 7. In other words, as soon as the motor vehicle 1 is behind the second safety line 78, there is no risk of a possible collision with an approaching vehicle 7.

In addition, a distance $d_{v2SL}$ along the second safety line 78 was defined in FIG. 13, which indicates the distance of the extreme front point of an approaching vehicle 7 along the second safety line 78. In the variant shown in FIG. 13, the time $t_{dYOP2SL} = dY_{OP2SL}/v_E$ is calculated in the context of the method according to the invention. Here $v_E$ describes the speed of the motor vehicle 1 in the direction $y_W$ of the coordinate system shown in FIG. 11, in other words perpendicular to the direction of travel of the road, and $t_{dYOP2SL}$ describes the time required in the course of the parking process until the motor vehicle 1 is completely behind the second safety line 78, especially until the extreme front point 74 is located behind the second safety line 78. In the context of the calculation shown by way of example, an average lateral vehicle speed is assumed to be known. Alternatively, lookup tables or physical models can be used to calculate the time mentioned. In principle, the described approach can be applied to both the extreme front point 64 and the extreme rear point 65 and also to other points located between these two points.

Furthermore, in the context of the variant shown in FIG. 13, the distance $d_{v1(tdYOP2SL)} = v_{V1} * t_{dYOP2SL} + \tfrac{1}{2}*a_{v1}*t_{dYOP2SL}^2$ is calculated. This distance should be less than or equal to the distance $d_{v2SL}$ which is available to the approaching motor vehicle 7 for stopping, in particular taking into account the speed $v_{v1}$ and the acceleration $a_{v1}$ of the vehicle 7. If the distance $d_{v1(tdYOP2SL)}$ is less than the distance $d_{v2SL}$, the time $t_{dYOP2SL}$ is recalculated by adjusting the speed $v_E$ and taking into account a maximum possible speed $v_{Emax}$, so that the condition is fulfilled whereby $d_{v1(tdYOP2SL)}$ is less than or equal to $d_{v2SL}$. In summary, in the variant shown in FIG. 13, the speed of the parking process of the motor vehicle 1 is adapted to the distance, speed and acceleration of an approaching vehicle 7 to avoid a collision.

In FIG. 14, a variant of a method according to the invention is illustrated for the case of an approaching vehicle 8 on the opposite lane. Here, the region of the safety line 6, which is located in the area of the road surface of the opposite lane 80, is first determined on the safety line 6. This region of the safety line 6 is denoted by reference number 79. Furthermore, the distance $d_{V2NSL}$ of the approaching vehicle 8 until reaching a point of the safety line 79, at which there would be a potential collision between the approaching vehicle 8 and the motor vehicle 1. For this purpose, the distance $dX_{OP2NSL}$ is determined, which the motor vehicle 1 must travel to get to the potential collision point. Based on this distance and the speed $v_E$ of the motor vehicle 1 during the parking process, the time $t_{dXOP2NSL}$ to reach a potential collision point on the safety line 79 is calculated according to $t_{dXOP2NSL}=dX_{OP2NSL}/v_E$.

Furthermore, based on the speed and the acceleration of the approaching vehicle 8, the distance $d_{v1}$ is calculated according to $d_{v1}(t_{dXOP2NSL})=v_{v1}*t_{dXOP2NSL}+\frac{1}{2}*a_{v1}*t_{dXOP2NSL}+\frac{1}{2}*a_{v1}*t_{dXOP2SLN}^2$, which must be less than or equal to the distance $d_{V2NSL}$ to avoid a collision. This is the possible distance for stopping the vehicle 8 for the current speed $v_1$ and the acceleration $a_{v1}$. If the distance $d_{v1}(t_{dXOP2NSL})$ is greater than $d_{V2NSL}$, the time $t_{dXOP2NSL}$ is recalculated to meet the aforementioned condition. The speed $v_E$ is adapted taking into account a maximum possible speed $v_{Emax}$ during the parking process.

Another variant is shown in FIG. 15. Here, three positions of the motor vehicle 1 are considered during the parking process. In the first position 81, the motor vehicle 1 does not yet cross the second safety line 78. In this case, the distance $d_{v2SL}$ describes the minimum distance between the four extreme points 64, 65, 74 and 75 of the motor vehicle 1 and the approaching vehicle 7. In the second position 82, The motor vehicle 1 has partially crossed the second safety line 78. In this case, the distance $d_{V2SL}$ describes the minimum distance between either the intersection of a connecting line of the vehicle contour of the motor vehicle 1, in particular the extreme left-side points 64 and 65, with the second safety line 78 or the remaining extreme points of the motor vehicle 1 outside the second safety line 78 and the approaching vehicle 7. In the third position 83 the entire contour of the vehicle 7, i.e. all extreme points 64, 65, 74 and 75, is behind the second safety line 78 and the vehicle 7 can drive past the motor vehicle 1 unhindered.

REFERENCE CHARACTER LIST

1 Motor vehicle
2 Road
3 Parking space
4 Motor vehicle
5 Trajectory
6 Outer safety line
7 Motor vehicle
8 Motor vehicle
9 Road area required for parking
10 Start
11 Finding a parking space
12 Determine parking space, stop vehicle, determine trajectory, start parking process
13 Enter user settings
14 Calculate maneuvering area
15 Illuminate the road surface required for parking for the currently performed maneuver or the imminent movement of the motor vehicle
16 Determine vehicles which will potentially intrude into the required maneuvering area
17 Probability of an intrusion of a detected vehicle into the maneuvering area and predicted excess speed at the time of intrusion
18 Outputting an indication in the form of a light pattern
19 Will the following maneuver change the direction of travel of the motor vehicle?
20 Is the parking maneuver still ongoing?
21 End
24 Monitoring the surroundings of the motor vehicle
25 Are there other vehicles in the surroundings of the vehicle?
26 Determine the distance between the individual other vehicles and the motor vehicle, their speed and acceleration
27 Is the approaching vehicle relevant for the current parking maneuver?
28 Is longitudinal control of the vehicle possible?
29 Parking maneuver completed or agreed?
30 End
31 Compare distances travelled depending on the time of the motor vehicle and the detected vehicle
32 Is the motor vehicle in a safe position before the detected vehicle reaches the motor vehicle?
33 Calculate the minimum speed of the motor vehicle required to avoid a conflict, in particular a collision
34 Is the calculated minimum speed less than the configured maximum speed?
35 Output an indication to the user
36 Did the user respond to an indication?
37 Braking intervention
38 Is this the first movement to park the vehicle in a parallel parking space?
39 Calculate trajectory to return to the parking space
40 Request to driver to drive the motor vehicle back into the parking space in accordance with the calculated trajectory
41 Waiting
42 Is the current driving maneuver the first movement to park in the selected parking space?
43 Is the calculated minimum speed less than the maximum maneuvering speed provided by the assistance function?
44 Continue parking maneuver with an adapted speed profile
45 Stop the motor vehicle
46 Waiting
47 Parking the motor vehicle in a parallel parking space?
48 Continue parking maneuver
49 Determining the minimum speed of the motor vehicle required to avoid a collision with the approaching vehicle
50 Is the calculated minimum speed less than the maximum maneuvering speed for which the parking assistance function is configured?
51 Continue parking maneuver with an adapted speed profile
52 Calculate the trajectory into the parking space
53 Moving the motor vehicle into the parking space according to the calculated trajectory 54 Waiting
55 Front of vehicle
56 Rear of vehicle
57 Parking assistance device
60 Indication sign
61 Rear axle
62 Front axle
63 Longitudinal axis
64 Left-side extreme front point of the motor vehicle
65 Left-side extreme rear point of the motor vehicle
66 Trajectory of the left-side extreme front point
67 Trajectory of the left-side extreme rear point
68 Image detail
74 Right-side extreme front point of the motor vehicle
75 Right-side extreme rear point of the motor vehicle
76 Trajectory of the right-side extreme front point
77 Trajectory of the right-side extreme rear point
78 Second safety line
79 Determined region of safety line 6 located in the area of the road surface of the opposite lane
80 Opposite lane
81 First position
82 Second position
83 Third position
Y yes
N no
$x_w$ Directional vector
$y_w$ Directional vector
x Directional vector
y Directional vector
$l_{vw}$ Width of the subject vehicle
$l_{wb}$ Distance between the front axle and the rear axle
$l_{ot}$ Distance between the front axle and the front of the vehicle
$l_{or}$ Distance between the rear axle and the rear of the vehicle
$d_{offset\_y}$ Safety distance in y-direction
$d_{offset\_x}$ Safety distance in x-direction
$v_{v1}$ Speed of another road user
$a_{v1}$ Acceleration of another road user
$d_{E2V}$ Distance between subject vehicle and another road user
$d_{v2SB}$ Distance of the vehicle 7 from a point SB on the safety line
SB Point on the safety line
$d_{E2SB}$ Distance of the motor vehicle 1 in x-direction from the point SB
$dY_{OP2SL}$ Distance between the extreme front point 64 and the second safety line, and between the extreme rear point 65 and the second safety line
$d_{v2SL}$ Distance of the extreme front point of an approaching vehicle along the second safety line
$d_{V2NSL}$ Distance of the approaching vehicle until reaching a point on the safety line where there would potentially be a collision between the approaching vehicle and the motor vehicle
$dX_{OP2NSL}$ Distance the motor vehicle must travel to reach the potential collision point
$\phi$ Yaw angle

The invention claimed is:

1. A method for operating a parking assistance function of a motor vehicle, wherein the motor vehicle comprises at least one sensor for detecting the road surrounding the motor vehicle, wherein the method includes the following steps:

searching for and specifying a free parking space;
determining a trajectory for parking the motor vehicle in the parking space and a sequence of an at least partially automated parking process;
determining at least one outer boundary line of the road surface required for parking along the determined trajectory;
detecting at least one road user approaching the determined outer boundary line on the road by means of at least one sensor; and
determining the distance between the road user approaching the determined outer boundary line and the outer boundary line,
wherein if the determined distance falls below a specified first threshold, outputting a warning signal to the approaching road user, and
wherein if the determined distance falls below a specified second threshold, the speed and/or acceleration of the approaching road user will be determined and if the determined speed exceeds a specified threshold and/or the determined acceleration exceeds a specified threshold, an adapted warning signal will be output to the approaching road user and/or the course of the parking process will be adapted.

2. The method according to claim 1, wherein the probability that the detected road user will cross the outer boundary line is determined and, if the determined probability exceeds a specified threshold, an adapted warning signal will be output to the approaching road user and/or the course of the parking process will be adapted.

3. The method according to claim 1, wherein the positions of the motor vehicle and the detected road user are determined as a function of time and, if it is not ensured that if the detected road user reaches the at least one safety line, the motor vehicle is in a position which allows the approaching road user to pass by a number of further steps of the method will be carried out, depending on whether the parking assistance function allows automated longitudinal control of the motor vehicle.

4. The method according to claim 3, wherein if the parking assistance function allows automated longitudinal control of the motor vehicle, it is checked whether the current movement of the motor vehicle is the first parking movement of the parking process, and wherein if it is the first parking movement, the minimum speed of the motor vehicle required to avoid a collision with the approaching road user is calculated and a number of further steps of the method are carried out depending on whether the calculated minimum speed is lower than a maximum speed specified for the parking assistance function.

5. The method according to claim 3, wherein if the parking assistance function allows automated longitudinal control of the motor vehicle, it is checked whether the current movement of the motor vehicle is the first parking movement of the parking process, and wherein if it is not the first parking movement of the parking process and if the specified parking space is not a parking space arranged parallel to the road, the minimum speed required to avoid a collision with the approaching road user is calculated and a number of further steps of the method are carried out depending on whether the calculated minimum speed is lower than a maximum speed specified for the parking assistance function.

6. The method according to claim 3, wherein if the parking assistance function does not allow automated longitudinal control of the motor vehicle, the minimum speed required to avoid a collision with the approaching road user is calculated and a number of further steps of the method are carried out depending on whether the calculated minimum speed is lower than a maximum speed specified for the parking assistance function.

7. The method according to claim 6, wherein if the calculated minimum speed is less than the specified maximum speed, at least one signal is output to a user.

8. The method according to claim 6, wherein if the calculated minimum speed is not less than the specified maximum speed, a number of further steps of the method are carried out depending on whether the current movement of the motor vehicle is the first parking movement of the parking process.

9. The method according to claim 1, wherein at least one camera and/or at least one radar sensor and/or at least one lidar sensor and/or at least one ultrasonic sensor is used as a sensor.

10. A parking assistance device for a motor vehicle, which comprises at least one sensor for detecting the vehicle surroundings, wherein the parking assistance device is designed to carry out the method according to claim 1.

11. A motor vehicle, which comprises a parking assistance device according to claim 10.

12. A method for operating a parking assistance function of a motor vehicle, wherein the motor vehicle comprises at least one sensor for detecting the road surrounding the motor vehicle, wherein the method includes the following steps:

searching for and specifying a free parking space;

determining a trajectory for parking the motor vehicle in the parking space and a sequence of an at least partially automated parking process;

determining at least one outer boundary line of the road surface required for parking along the determined trajectory;

detecting at least one road user approaching the determined outer boundary line on the road by means of at least one sensor; and determining the distance between the road user approaching the determined outer boundary line and the outer boundary line, wherein if the determined distance falls below a specified first threshold, outputting a warning signal to the approaching road user, and wherein the positions of the motor vehicle and the detected road user are determined as a function of time and, if it is not ensured that if the detected road user reaches the at least one safety line, the motor vehicle is in a position which allows the approaching road user to pass by, a number of further steps of the method will be carried out, depending on whether the parking assistance function allows automated longitudinal control of the motor vehicle.

* * * * *